US007712584B2

(12) United States Patent
Aulanko et al.

(10) Patent No.: US 7,712,584 B2
(45) Date of Patent: May 11, 2010

(54) EMERGENCY BRAKING FOR AN ELEVATOR WITHOUT COUNTERWEIGHT

(75) Inventors: Esko Aulanko, Kerava (FI); Jorma Mustalahti, Hyvinkää (FI); Johannes De Jong, Järvenpää (FI); Pekka Rantanen, Hyvinkää (FI)

(73) Assignee: KONE Corporation, Helsinki (FI)

( * ) Notice: Subject to any disclaimer, the term of this patent is extended or adjusted under 35 U.S.C. 154(b) by 0 days.

(21) Appl. No.: 11/649,807

(22) Filed: Jan. 5, 2007

(65) Prior Publication Data

US 2007/0227833 A1 Oct. 4, 2007

Related U.S. Application Data

(63) Continuation of application No. PCT/FI2005/000262, filed on Jun. 6, 2005.

(30) Foreign Application Priority Data

Jul. 30, 2004 (FI) .................................. 20041044

(51) Int. Cl.
*B66B 11/08* (2006.01)
*B66B 17/12* (2006.01)
*B60T 13/04* (2006.01)
*B66D 1/00* (2006.01)

(52) U.S. Cl. ....................... 187/254; 187/266; 188/171; 254/266

(58) Field of Classification Search ................. 188/163, 188/164, 171, 73.1, 343, 180, 82.1–82.3, 188/382; 187/373, 376, 350, 355–356, 358–360, 187/254, 256, 288, 264, 266, 291; 254/264–268
See application file for complete search history.

(56) References Cited

U.S. PATENT DOCUMENTS 998,016 A 3/1911 Neenan (Continued)

FOREIGN PATENT DOCUMENTS

DE 1251926 * 4/1965

(Continued)

OTHER PUBLICATIONS

Office Action for corresponding European application No. 05748873.6-1256 dated Nov. 14, 2007.

*Primary Examiner*—John Q Nguyen
*Assistant Examiner*—Stefan Kruer
(74) *Attorney, Agent, or Firm*—Harness, Dickey & Pierce, P.L.C.

(57) ABSTRACT

An elevator without counterweight may Include an elevator car suspended by a hoisting rope, a traction sheave operatively connected to the elevator car by the hoisting rope, and a brake structure configured to engage with the traction sheave in a braking operation in an upward motion and a downward motion of the elevator car. The brake structure may include first and second brake elements. The first brake element may include a surface engageable with the traction sheave, and first contact and sliding surfaces. The second brake element may include second contact and sliding surfaces. The first sliding surface may slide along the second sliding surface relative to the second brake element when the elevator car moves with the upward motion. The second contact surface may contact the first contact surface to stop a sliding motion of the first brake element when the elevator car moves with the downward motion.

20 Claims, 3 Drawing Sheets

U.S. PATENT DOCUMENTS

Figure 1:
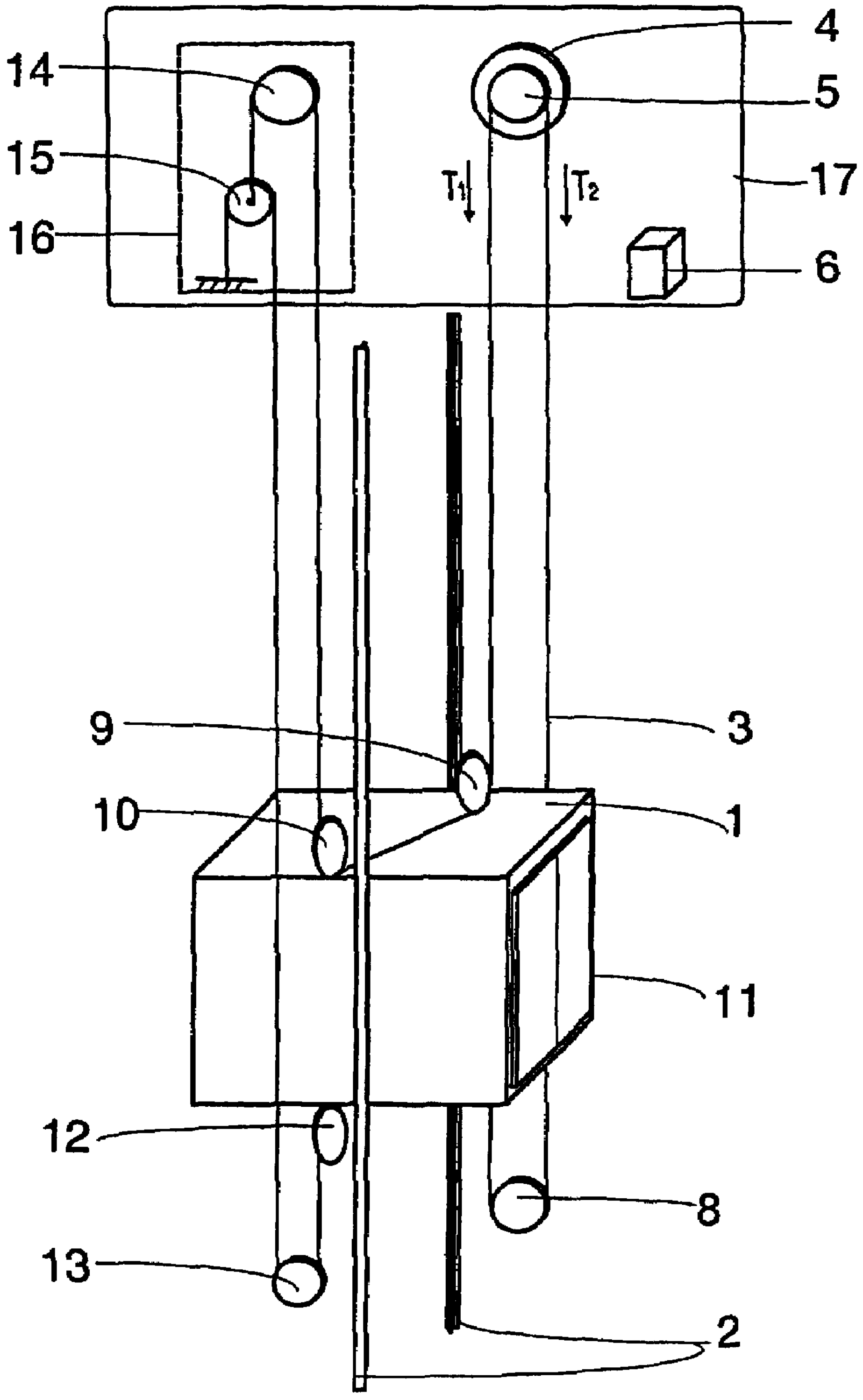

| | | | | | |
|---|---|---|---|---|---|
| 1,980,230 | A | * | 11/1934 | See | 187/357 |
| 2,403,125 | A | * | 7/1946 | Santini et al. | 187/288 |
| 3,613,835 | A | * | 10/1971 | Vizzotto | 187/288 |
| 4,658,940 | A | * | 4/1987 | Ulmann | 188/265 |
| 4,923,055 | A | * | 5/1990 | Holland | 187/287 |
| 5,007,505 | A | * | 4/1991 | Lindegger | 187/254 |
| 5,398,781 | A | | 3/1995 | Biewald et al. | |
| 5,788,018 | A | | 8/1998 | Mendelsohn | |
| 6,193,017 | B1 | | 2/2001 | Köster | |
| 2003/0168287 | A1 | * | 9/2003 | Helmle | 187/288 |

FOREIGN PATENT DOCUMENTS

| | | | | |
|---|---|---|---|---|
| EP | 0631967 | | | 1/1995 |
| EP | 0631968 | | | 1/1995 |
| GB | 1442584 | | | 2/1975 |
| JP | 03-264482 | | | 11/1991 |
| JP | 4201964 | | | 7/1992 |
| JP | 07015668 | | | 3/1995 |
| JP | 8198542 | | | 8/1996 |
| WO | WO 2004041704 | | | 5/2004 |
| WO | WO 2004/050526 | A1 | | 6/2004 |
| WO | WO 2006038284 | A1 | * | 4/2006 |

* cited by examiner

EMERGENCY BRAKING FOR AN ELEVATOR WITHOUT COUNTERWEIGHT

This application is a continuation of PCT/FI2005/000262 filed on Jun. 6, 2005, which is an international application claiming priority from FI 20041044 filed Jul. 20, 2004, the entire contents of which are hereby incorporated by reference.

The present invention relates to a traction sheave elevator and a method for braking a traction sheave elevator.

One of the objectives in elevator development work is to achieve efficient and economical utilization of building space. In recent years, this development work has produced various elevator solutions without machine room, among other things. Good examples of elevators without machine room are disclosed in specifications EP 0 631 967 (A1) and EP 0 631 968. The elevators described in these specifications are fairly efficient in respect of space utilization as they have made it possible to eliminate the space required by the elevator machine room in the building without a need to enlarge the elevator shaft. In the elevators disclosed in these specifications, the machine is compact at least in one direction, but in other directions it may have much larger dimensions than a conventional elevator machine.

In these basically good elevator solutions, the space required by the hoisting machine limits the freedom of choice in elevator lay-out solutions. Space is needed for the arrangements required for the passage of the hoisting ropes. It is difficult to reduce the space required by the elevator car itself on its track and likewise the space required by the counterweight, at least at a reasonable cost and without impairing elevator performance and operational quality. In a traction sheave elevator without machine room, mounting the hoisting machine in the elevator shaft is often difficult, especially in a solution with machine above, because the hoisting machine is a sizeable body of considerable weight. Especially in the case of larger loads, speeds and/or travel heights, the size and weight of the machine are a problem regarding installation, even to the extent that the required machine size and weight have in practice limited the sphere of application of the concept of elevator without machine room or at least retarded the introduction of said concept in larger elevators. In modernization of elevators, the space available in the elevator shaft often limits the area of application of the concept of elevator without machine room. One prior-art solution is disclosed in publication U.S. Pat. No. 5,788,018, in which the elevator car is suspended with a suspension ratio of 1:1, and in which various tensioning devices are used to tension the continuous hoisting rope. The compensation sheave described in this publication is regulated by a separate control system, said system being controlled by means of an external control, which system requires control implemented by means of a complex external control. A recent traction sheave elevator solution with no counterweight, WO2004041704, presents a viable solution in which movement of the elevator car in the elevator is based on traction friction from the hoisting ropes of the elevator by means of a traction sheave. This elevator solution is primarily aimed at low buildings and/or buildings with a low travel height. The problems that are solved in this publication are mainly applicable for use in relatively low buildings, and although the concepts also apply to larger travel heights, larger travel heights and higher speeds introduce new problems to be solved. In prior-art elevator solutions without counterweight, the tensioning of the hoisting rope is implemented by means of a weight or spring, and this is not an attractive approach to implementing the tensioning of the hoisting rope. Another problem with elevator solutions without counterweight, e.g. when long ropes are also used due to e.g. a large travel height or high-rise buildings and/or the length of the rope due to large suspension ratios, is compensation of the elongation of the ropes and the fact that, due to rope elongation, the friction between the traction sheave and the hoisting ropes is insufficient for the operation of the elevator.

The object of the present invention is to achieve at least one of the following objectives. On the one hand, it is an aim of the invention to develop the elevator without machine room further so as to allow more effective space utilization in the building and elevator shaft than before. This means that the elevator should be capable of being installed in a fairly narrow elevator shaft if necessary. One objective is to achieve an elevator in which the hoisting rope has a good grip/contact on the traction sheave. A further aim of the invention is to achieve an elevator solution without counterweight without compromising the properties of the elevator. An additional objective is to eliminate rope elongations. Yet a further objective of the invention is to achieve an elevator by means of which it is possible to implement an elevator without counterweight in high-rise buildings and/or a fast elevator without counterweight. Another aim is to achieve an elevator that is safe in each situation, such as e.g. also in an emergency stop and in particular when effecting an emergency stop of the elevator while the elevator car is traveling upwards.

The object of the invention should be achieved without compromising the possibility of varying the basic elevator lay-out.

The elevator of the invention and the method of the invention are discussed below. Some embodiments of the invention are characterized by what is disclosed in the claims. Some inventive embodiments are also discussed in the descriptive section of the present application. The inventive content of the application can also be defined differently than in the claims presented below. The inventive content may also consist of several separate inventions, especially if the invention is considered in the light of explicit or implicit sub-tasks or from the point of view of advantages or categories of advantages achieved. In this case, some of the attributes contained in the claims below may be superfluous from the point of view of separate inventive concepts. The various embodiments of the invention and the features and details of the embodiment examples can be used in conjunction with each other.

By applying the invention, one or more of the following advantages, among others, can be achieved:

- The elevator of the invention is safe also in an emergency braking situation, especially when braking while the elevator car is moving upwards
- The operation of the brake of the invention can be easily implemented both by means of a control arrangement and by means of the construction of the brake
- Operation of the brake while the elevator car is moving upwards in an emergency situation is prevented by means of the construction of the brake or by means of the control
- Control of the brake is ensured by means of reserve power, also in a situation where there is interference in the supply of electricity to the elevator
- The relevant brake function is advantageously applicable for use in high-rise buildings and in fast elevators without counterweight
- The delay in engagement of the brake when braking in the upward direction can easily be made constant or the delay can easily be set to be dependent on the speed of the elevator.

The primary area of application of the invention is elevators designed for the transportation of people and/or freight. A typical area of application of the invention is in elevators whose speed range is higher than about 1 m/s, but may also be lower than 1.0 m/s. For example, an elevator having a traveling speed of 6 m/s and/or an elevator having a traveling speed of 0.6 m/s is easy to implement according to the invention.

In both passenger and freight elevators many of the advantages achieved through the invention are pronouncedly brought out even in elevators for only 2-4 people, and distinctly brought out in elevators for 6-8 people (500-630 kg).

In the elevator of the invention, normal elevator hoisting ropes, such as generally used steel ropes, are applicable. In the elevator, it is possible to use ropes made of artificial materials and ropes in which the load-bearing part is made of artificial fiber, such as e.g. so-called “aramid ropes”, which have recently been proposed for use in elevators. Applicable solutions also include steel-reinforced flat ropes, especially because they allow a small deflection radius. Particularly well applicable in the elevator of the invention are elevator hoisting ropes twisted e.g. from round and strong wires. From round wires, the rope can be twisted in many ways using wires of different or equal thickness. It is also possible to use conventional elevator hoisting ropes in the elevator of the invention. In an elevator with a suspension ratio of 2:1, for example, having a traveling speed of about 6 m/s and with the mass of the car plus maximum load being about 4000 kg, only six elevator hoisting ropes each of 13 mm in diameter are needed. Preferred areas of application for an elevator according to the invention with a 2:1 suspension ratio are elevators whose speed is in a range above 4 m/s. One design criterion in the elevator of the invention has been to keep rope speeds below 20 m/s. However, when the rope speed is about 10 m/s, the speed range of the elevator is one in which the operation and behavior of the rope on the traction sheave of the elevator are very well known. A preferred solution of the elevator of the invention is an elevator without machine room, but also solutions with a machine room are easy to implement by means of the invention. In high-rise buildings, the absence of a machine room is not necessarily significant, but if even 10-20%, or even higher, savings in shaft space are achieved by means of elevators according to the invention, really significant advantages in utilizing the surface area of a building will be achieved.

Preferred embodiments of an elevator without counterweight according to the invention are, for example, with a suspension ratio of 4:1 and using conventional elevator hoisting ropes of 8 mm in diameter and with the speed of the elevator being e.g. 3 m/s and with the weight of the elevator car plus maximum load being 4000 kg, in which case only eight hoisting ropes are needed. Another example of a preferred embodiment is an elevator without counterweight having a suspension ratio of 6:1, the speed of said elevator being 1.6 m/s, and in which conventional ropes of 8 mm in diameter are used, and with the mass of the elevator car of the elevator plus maximum load being at most 3400 kg, in which case only 5 hoisting ropes are needed.

Braking in the upward direction in a traction sheave elevator without counterweight is extremely fast when the brake engages during an emergency stop because the moving masses are reasonably small in relation to the net forces of deceleration. Gravity assists the deceleration of the car, but the force factor in the opposing direction caused by the counterweight is absent. Especially in emergency stops occurring at high speeds the duration of the effect of the deceleration force on a passenger is of the extent that the “lightening” of the passenger can have serious consequences such as, for example, injury to the passenger. High deceleration in any case causes unpleasant feelings for most people. In the worst case the additional deceleration of the car caused by friction and braking increases the deceleration of the car to more than the force of gravity g, in which case the passenger, who decelerates only under the influence of his/her own gravity, detaches from the floor of the car. One object of the present invention is therefore to achieve deceleration that in every possible situation is appreciably less than the gravitational force g of the whole elevator.

The problem is solved in the elevator without counterweight of the invention in such a way that a control arrangement prevents the brake from engaging to brake the car while it is moving in the upward direction when an emergency stop occurs. Controlled operation of the brake is ensured by means of reserve power. Another alternative is to structurally make a holding brake for the elevator that is designed in such a way that the holding brake detains essentially only a downward movement of the elevator car. The braking force of the holding brake in the direction of upward movement is appreciably smaller than in the direction of downward movement or even non-existent. The greater the mass of the hoisting ropes in relation to the mass of the car, the smaller deceleration the elevator car has. Thus the deceleration of elevators with a large travel height, which are therefore by nature fast, is lower.

The traction sheave elevator without counterweight of the invention, in which the elevator car is suspended in the elevator by means of hoisting ropes consisting of a single rope or several parallel ropes, said elevator having a traction sheave which moves the elevator car by means of the hoisting ropes. In an emergency stop situation when the elevator car in the elevator is moving upwards, the braking of the operating brake of the elevator is at least partially prevented for at least a part of the stopping distance of the elevator.

The method of the invention for braking a traction sheave elevator without counterweight braking is implemented in a way that when the elevator car is moving upwards in an emergency stop situation, the braking of the operating brake of the elevator is at least partially prevented for at least a part of the stopping distance of the elevator.

Figure 2:
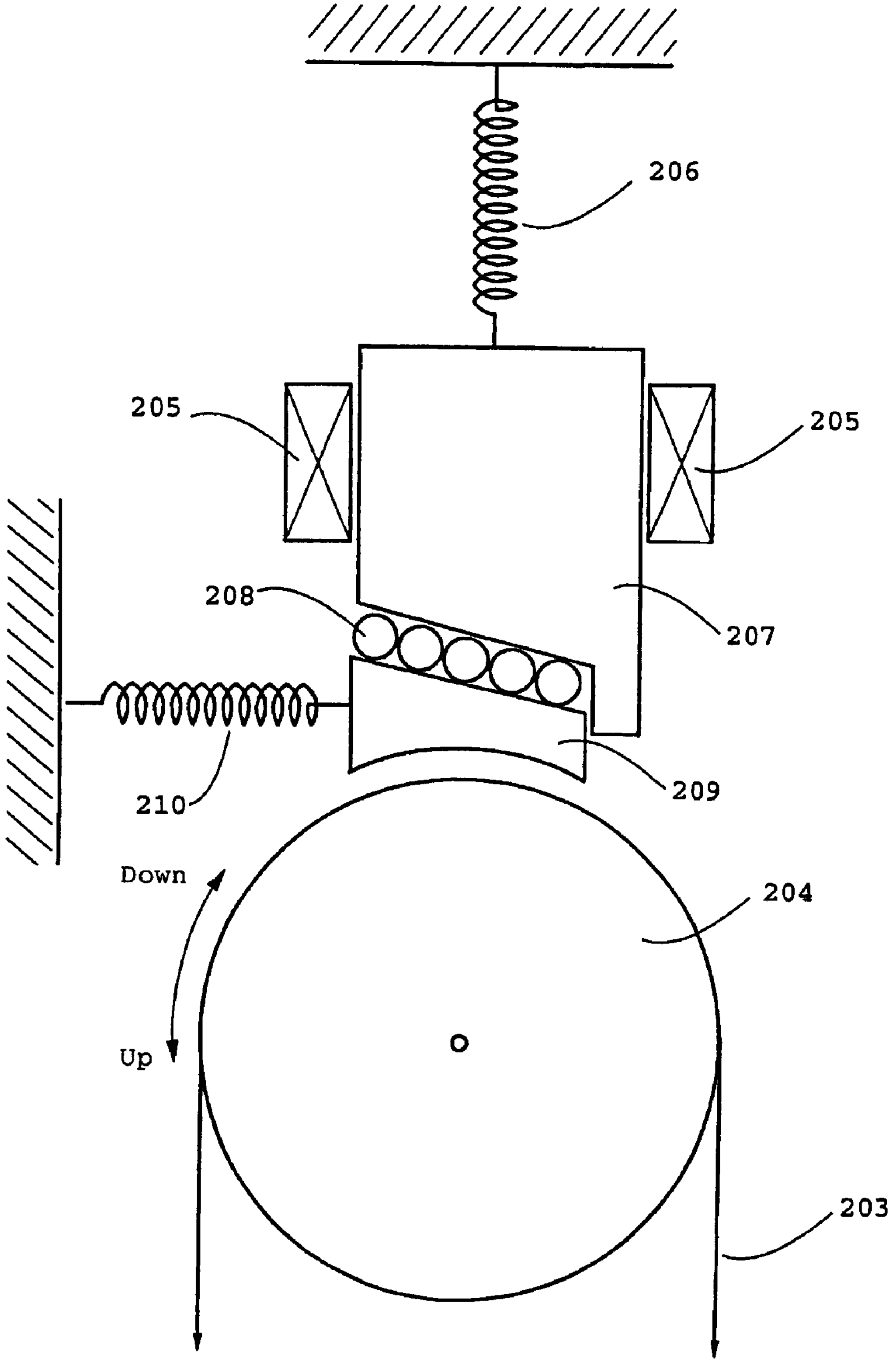
Figure 3:
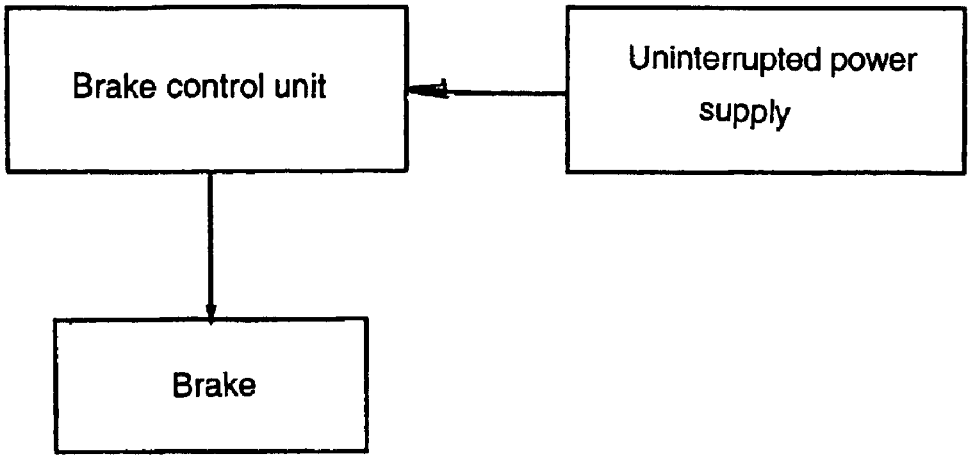
Figure 4:
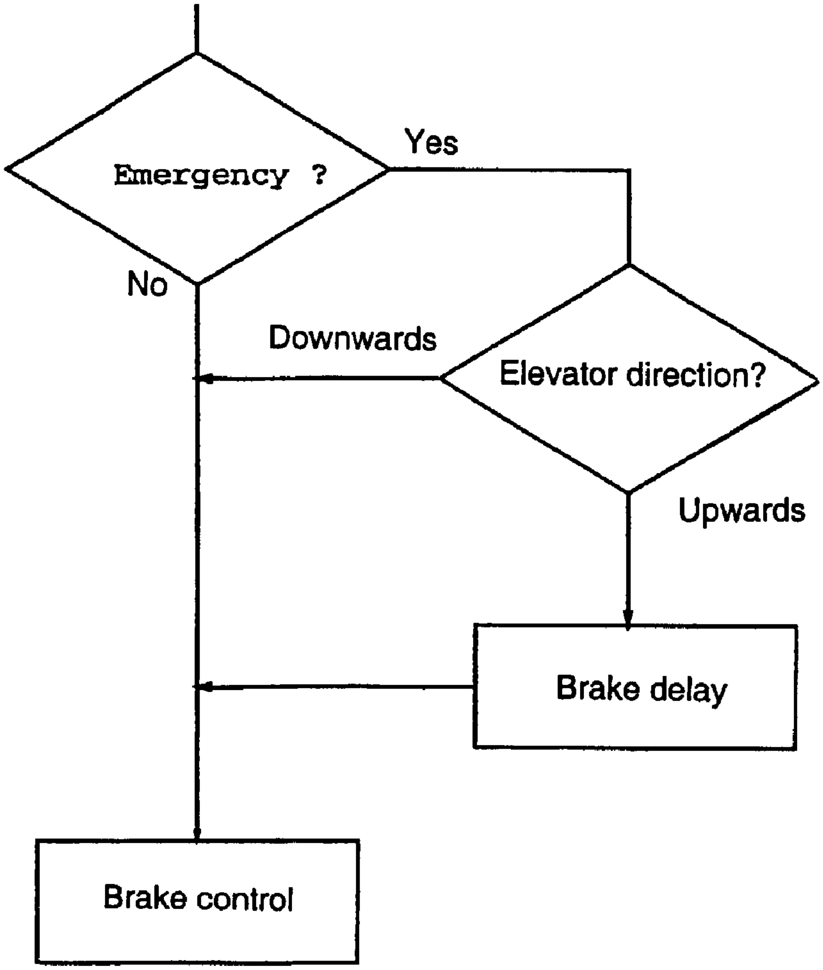

In the following, the invention will be described in more detail by the aid of a few examples of its embodiments with reference to the attached drawings, wherein FIG. 1 presents a diagrammatic view of a traction sheave elevator without counterweight according to the invention, FIG. 2 presents a diagrammatic view of an operating brake of an elevator according to the invention, FIG. 3 is a diagram representing a control arrangement of a brake according to the invention, and FIG. 4 is a diagram representing a control flowchart of a brake according to the invention.

FIG. 1 presents a diagrammatic illustration of a traction sheave elevator without counterweight according to the invention, in which the compensating system according to the invention is situated in the upper part of the shaft, i.e. in the case of FIG. 1 in the machine room 17. The elevator is an elevator with machine room, with a drive machine 4 placed in the machine room 17. The elevator shown in the figure is a traction sheave elevator without counterweight, in which the elevator car 1 moves along guide rails 2. In elevators with a large travel height, the elongation of the hoisting rope involves a need to compensate the rope elongation, which has to be done reliably within certain permitted limit values. In that case it is essential in respect of elevator operation and safety that the hoisting rope portion below the elevator car should be kept sufficiently tight. In the rope force compensating system 16 of the invention presented in FIG. 1, a very long movement for compensating rope elongation is achieved. This enables compensation of also large elongations, which is not often possible with simple lever solutions or with spring solutions.

The compensating system 16 of the invention shown in FIG. 1 keeps the rope tensions $T_1$ and $T_2$ acting over the traction sheave at a constant ratio of $T_1/T_2$. In the case presented in FIG. 1 the $T_1/T_2$ ratio is 2/1. With even suspension ratios above and below the elevator car, the compensating system 16 is disposed in the machine room or elevator shaft or other place suitable for the purpose that is not connected to the elevator car, and with odd suspension ratios above and below the elevator car the compensating system 16 is connected to the elevator car.

In FIG. 1 the passage of the hoisting ropes is as follows: One end of the hoisting ropes 3 is fixed to the diverting pulley 15 and/or any suspension arrangement for said diverting pulley. Diverting pulleys 14 and 15 form the compensating system 16 in FIG. 1. The compensating system 16 is disposed in the machine room 17 of the elevator. From diverting pulley 15 the hoisting ropes 3 run upwards encountering the other diverting pulley 14 of the compensating system 16, which the rope passes around via the rope grooves in the diverting pulley 14. These rope grooves can be coated or uncoated, e.g. with friction increasing material, such as polyurethane or other appropriate material. All the diverting pulleys of the elevator or only some and/or the traction sheave can be coated with said material. After passing around the diverting pulley 14, the ropes continue downwards in the elevator shaft to the diverting pulley 10 mounted on the elevator car 1, and having passed around this pulley the hoisting ropes 3 run across the top of the elevator car 1 to diverting pulley 9, which is mounted on the elevator car 1 and to the other side of the elevator shaft. The passage of the hoisting ropes 3 to the other side of the elevator shaft is arranged by means of diverting pulleys 10 and 9, a preferred way of arranging the passage of the hoisting rope across the elevator car 1 being diagonally via the centre of mass of the elevator car. After passing around diverting pulley 9 the rope returns upwards to the hoisting machine 4 located in the machine room 17 and to the traction sheave 5 of said machine. The diverting pulleys 14, 10, 9 together with the traction sheave 5 of the hoisting machine 4 form the suspension arrangement above the elevator car, the suspension ratio of which is the same as that of the suspension arrangement below the elevator car, said suspension ratio being 2:1 in FIG. 1. The first rope tension $T_1$ acts on the part of the hoisting ropes above the elevator car. After passing around the traction sheave 5 the ropes continue their passage along the elevator shaft to the diverting pulley 8, said diverting pulley 8 being advantageously disposed in the lower part of the elevator shaft. After passing around the diverting pulley 8 the ropes 3 continue upwards to the diverting pulley 11 mounted on the elevator car, said diverting pulley not being visible in FIG. 1. After passing around the diverting pulley 11 the hoisting ropes continue their passage, in a similar manner as the roping above the elevator car 1, across the elevator car 1 to the diverting pulley 12 positioned on the other side of the elevator car and at the same time the hoisting ropes move to the other side of the elevator shaft. After passing around the diverting pulley 12, the hoisting ropes 3 continue downwards to the diverting pulley 13 in the lower part of the elevator shaft, and having passed around this pulley continue and return to the other diverting pulley 15 of the compensating system 16 in the machine room 17 of the elevator, and having passed around said diverting pulley 15 the hoisting ropes run to the fixing point of the other end of the hoisting rope, said fixing point being located in a suitable place in the machine room 17 or in the elevator shaft. The diverting pulleys 8,11, 12,13 form the suspension arrangement of the hoisting ropes below the elevator car and a part of the roping. The other rope tension $T_2$ of the hoisting rope acts on this part of the hoisting ropes below the elevator car. The diverting pulleys of the lower part of the elevator shaft can be immovably fixed to the frame structure formed by the guide rails 2 or to a beam structure located at the lower end of the elevator shaft or each one separately to the lower part of the elevator shaft or to any other fixing arrangement suited to the purpose. The diverting pulleys on the elevator car can be immovably fixed to the frame structure of the elevator car 1, such as e.g. to the car sling, or to a beam structure or beam structures on the elevator car or each one separately to the elevator car or to any other fixing arrangement suited to the purpose. The diverting pulleys can also be modular in structure, e.g. in such a way that they are separate modular structures, such as e.g. of the cassette type, that are immovably fixed to the shaft structures of the elevator, to the structures of the elevator car and/or of car sling or to another appropriate place in the elevator shaft, or in its proximity, or in connection with the elevator car and/or in the machine room of the elevator. The diverting pulleys located in the elevator shaft and the devices of the hoisting machine and/or the diverting pulleys connected to the elevator car can be disposed either all on one side of the elevator car in a space between the elevator car and the elevator shaft or otherwise they can be disposed on different sides of the elevator car in the manner desired.

The drive machine 4 placed in the machine room 17 is preferably of a flat construction, in other words the machine has a small thickness dimension as compared to its width and/or height. In the elevator without counterweight of the invention, it is possible to use a drive machine 4 of almost any type and design that fits into the space intended for it. For example, it is possible to use a geared or gearless machine. The machine may be of a compact and/or flat size. In the suspension solutions according to the invention, the rope speed is often high compared to the speed of the elevator, so it is possible to use even unsophisticated machine types as the basic machine solution. The machine room of the elevator is preferably provided with equipment required for the supply of power to the motor driving traction sheave 5 as well as equipment needed for elevator control, both of which can be placed in a common instrument panel 6 or mounted separately from each other or integrated partly or wholly with the drive machine 4. A preferred solution is a gearless machine comprising a permanent magnet motor. FIG. 1 illustrates a preferred suspension solution in which the suspension ratio of the diverting pulleys above the elevator and the diverting pulleys below the elevator car is the same 2:1 suspension in both cases. To visualize this ratio in practice, it means the ratio of the distance traveled by the hoisting rope to the distance traveled by the car. The suspension above the elevator car 1 is implemented by means of the diverting pulleys 14,10,9 and the traction sheave 5 and the suspension arrangement below the elevator car 1 is implemented by means of the diverting pulleys 13,12,11,8. Other suspension arrangements can also be used to implement the invention, such as e.g. larger suspension ratios, which are implemented by means of a number of diverting pulleys above and below the elevator car. The elevator of the invention can also be implemented as a solution without machine room or the machine may be mounted to be movable together with the elevator. It is advantageous to place the compensating system 16 in the upper part of the elevator, preferably in the machine room, especially in elevators with a high travel height, which elevators are usually also fast in terms of travel speed. In that case, the placement of the compensating system according to the invention results in a considerable reduction in the overall rope elongation of the hoisting ropes of the elevator, because with this placement of the compensating system the upper portion of the hoisting ropes, i.e. the portion located above the compensating system, in which there is greater rope tension, becomes shorter. The portion of the hoisting ropes below the compensating system, however, then increases. Placing the compensating system in the machine room also enables easier access to it.

The compensating system 16 for rope force in the elevator that is presented in FIG. 1 compensates rope elongation by means of the movement of the diverting pulley 15. Diverting pulley 15 moves a limited distance thereby equalizing elongations of the hoisting ropes 3. Additionally, the arrangement in question keeps the rope tension over the traction sheave 5 constant, whereby the ratio between the first and second rope tension, the $T_1/T_2$ ratio, in the case of FIG. 1 is approximately 2/1. Diverting pulley 15, which in FIG. 1 functions as a compensating pulley, can be controlled by means of guide rails to stay on its desired track, especially in situations in which the compensating system 16 receives a powerful impact, such as e.g. during wedge gripping of the elevator. By means of the guides of diverting pulley 15, the distance between the elevator car and the compensating system can be kept to that desired and movement of the compensating system can be kept under control. The guide rails used for the compensating system can be almost any type of guide rails suited to the purpose, such as e.g. guide rails made of metal or other material suitable for the purpose or e.g. rope guides. A buffer can also be fitted to the compensating system 16 to dampen the impacts of the diverting pulleys of the compensating system and/or to prevent slackening of the compensating system. The buffer used can be disposed e.g. in such a way that the compensating pulley 15 remains supported by the buffer before the rope elongation of the hoisting ropes has had time to fully unlay into the hoisting ropes, especially into the part of the ropes above the elevator car. One design criterion in the elevator of the invention has been to ensure that the compensating system is prevented from feeding rope from the compensating system in the direction of the portions of rope below the elevator car when ranging outside the normal compensation area of the compensating system, thereby maintaining a certain tension in the hoisting ropes. It is also possible to implement the compensating system 16 differently than presented in the forgoing example, such as with more complex suspension arrangements in the compensating system, such as e.g. by arranging different suspension ratios between the diverting pulleys of the compensating system. It is also possible to use a lever suited to the purpose, compensating pulleys or other rope tension compensating arrangement suited to the purpose, or a hydraulic rope force compensating device as the compensating system 16. A preferred embodiment of the elevator with a 2:1 suspension ratio presented in FIG. 1 is an elevator with a speed of approximately 6 m/s and a movable mass, which consists of the mass of the car and its equipment as well as the mass of the maximum load, of about 4000 kg, and in which elevator only six elevator hoisting ropes each of about 13 mm in diameter are needed. The preferred areas of application for the elevator of the invention with a suspension ratio of 2:1 are elevators whose speed is in a range above 4 m/s.

FIG. 2 presents a diagrammatic illustration of one structure of the operating brake of the elevator according to the invention. FIG. 2 shows the operating brake of the elevator. Normal operation of the operating brake of the elevator is achieved in an emergency braking situation with the arrangement and structure presented in FIG. 2 when braking with emergency braking while the elevator car is moving down. When the elevator car is moving upwards, a delay of a desired magnitude and/or lightened braking is achieved for the operating brake. The brake operates such that when moving downwards with the elevator car, the brake brakes normally in an emergency braking situation. With electricity being supplied to windings 205 when the elevator is operating normally, if the electricity is cut off, the spring 206 engages the brake to brake the machine 204 by means of brake elements 207 and 209. The brake also operates normally in an emergency braking situation, when the elevator car is moving downwards. In other words, the brake in this situation brakes via brake elements 207 and 209 according to the control of the brake. The amount of braking force achieved depends on the control of the windings 205. When the elevator car is moving upwards by means of the hoisting ropes 203, the operation of the brake is different. When emergency braking in the upward direction, in the case of FIG. 2, a delay for the operating brake is achieved by means of the wedge-like structure of brake element 209 and by means of the returning spring 210. Movement of the wedge-like brake elements with respect to each other can be ensured, e.g., by means of bearings 208. Thus, in an emergency braking situation when moving upwards, the desired delay for the brake is achieved by means of the structure of brake element 209. Lightened braking force is also achieved by means of the returning spring 210 and the structure of brake element 209. In the case of FIG. 2, the delay of the brake can easily be made constant.

FIG. 3 presents a diagrammatic illustration of the arrangement of the control function of the operating brake of the elevator of the invention. The operating brake of the elevator can include e.g. at least the operating brake of the elevator, the control unit of the operating brake and an uninterrupted power supply to the brake and to its control. The uninterrupted supply can be implemented e.g. by ensuring reserve power for the equipment e.g. by means of accumulators or a similar arrangement. The components and constituent parts needed for the control of the operating brake of the elevator can differ from those presented in FIG. 3.

FIG. 4 presents a diagrammatic illustration of the control of the operating brake of the elevator shown as a flowchart. The control consists of steps, in which first it is determined whether an emergency braking situation exists. If the result of this determination is that no emergency braking situation exists, the operation of the brake is controlled normally by the brake control. If, on the other hand, an emergency braking situation exists, the operating brake of the elevator must identify in which direction the elevator car is moving. If the elevator car is moving downwards, the next step is again normal control of the brake of the elevator. If, on the other hand, it is ascertained that the elevator is moving upwards, a pre-defined braking delay occurs in the control. The braking delay can be constant or otherwise it can be defined as dependent on the acceleration and/or on the speed and mass.

A preferred embodiment of the elevator of the invention is an elevator with machine room, in which the drive machine has a coated traction sheave. The hoisting machine has a traction sheave and diverting pulley, and in said machine the traction sheave and diverting pulley are pre-fitted at a correct angle relative to each other. The hoisting machine together with its control equipment is disposed in the machine room of the elevator, in which room the compensating system of the elevator is also placed. The elevator is implemented without counterweight with a suspension ratio of 2:1 so that both the roping suspension ratio above the elevator car and the roping suspension ratio below the elevator car is the same 2:1, and that the roping of the elevator runs in the space between one of the walls of the elevator car and the wall of the elevator shaft. The elevator has a compensating system that keeps the ratio between rope tensions $T_1/T_2$ constant at a ratio of about 2:1. The compensating system of the elevator has at least one locking means, preferably brake elements, and/or a slack rope prevention means for preventing uncontrolled slackening of the hoisting ropes and/or uncontrolled movement of the compensating system, said slack rope prevention means preferably being a buffer. The additional force caused by the masses of the diverting pulley and its suspension arrangement and of additional weights connected to the diverting pulley are utilized in the compensating system, said additional force being substantially directed in the same direction as the first rope tension $T_1$, and which additional force increases the rope tension $T_2$, thereby making the ratio $T_1/T_2$ more advantageous.

It is obvious to the person skilled in the art that different embodiments of the invention are not limited to the examples described above, but that they may be varied within the scope of the claims presented below. For instance, the number of times the hoisting ropes are passed between the upper part of the elevator shaft and the elevator car and the diverting pulleys below it and the elevator car is not a very decisive question, although it is possible to achieve some additional advantages by using multiple rope passages. In general, applications are so implemented that the ropes go to the elevator car from above as many times as from below, so that the suspension ratios of diverting pulleys going upwards and diverting pulleys going downwards are the same. It is also obvious that the hoisting ropes need not necessarily be passed under the car. In accordance with the examples described above, the skilled person can vary the embodiment of the invention, while the traction sheaves and rope pulleys, instead of being coated metal pulleys may also be uncoated metal pulleys or uncoated pulleys made of some other material suited to the purpose.

It is further obvious to the person skilled in the art that the traction sheaves and rope pulleys used in the invention, whether metallic or made of some other material suited to the purpose, which function as diverting pulleys and which are coated with a non-metallic material at least in the area of their grooves, may be implemented using a coating material consisting of e.g. rubber, plastic, polyurethane or some other material suited to the purpose. It is also obvious to the person skilled in the art that in rapid movements of the compensating system, which occur e.g. during wedge gripping of the elevator, the additional force of the invention also causes an inertial term in the rope force, which tries to resist the movement of the compensating system. The greater the acceleration of the diverting pulley/diverting pulleys and weights of the compensating system 16, the greater is the significance of the inertia mass, which tries to resist the movement of the compensating system and to reduce the impact on the buffer of the compensating system, because the movement of the compensating system occurs against the force of gravity. It is also obvious to the person skilled in the art that the elevator car and the machine unit may be laid out in the cross-section of the elevator shaft in a manner differing from the lay-out described in the examples. Such a different lay-out may be e.g. one in which the machine is located behind the car as seen from the shaft door and the ropes are passed under the car diagonally relative to the bottom of the car. Passing the ropes under the car in a diagonal or otherwise oblique direction relative to the form of the bottom provides an advantage when the suspension of the car on the ropes is to be made symmetrical relative to the centre of mass in other types of suspension lay-outs as well.

It is also obvious to the person skilled in the art that the equipment required for the supply of power to the motor and the equipment needed for elevator control can be placed elsewhere than in connection with the machine unit, e.g. in a separate instrument panel, or equipment needed for control can be implemented as separate units which can be disposed in different places in the elevator shaft and/or in other parts of the building. It is likewise obvious to the skilled person that an elevator applying the invention may be equipped differently from the examples described above. It is further obvious to the skilled person that the elevator of the invention can be implemented using almost any type of flexible hoisting means as hoisting ropes, e.g. flexible rope of one or more strands, flat belt, cogged belt, trapezoidal belt or some other type of belt applicable to the purpose. It is also obvious to the skilled person that, instead of using ropes with a filler, the invention may be implemented using ropes without filler, which are either lubricated or unlubricated. In addition, It is also obvious to the skilled person that the ropes may be twisted in many different ways.

It is also obvious to the person skilled in the art that the elevator of the invention can be implemented using different roping arrangements between the traction sheave and the diverting pulley/diverting pulleys to increase the contact angle a than those described as examples. For example, it is possible to dispose the diverting pulley/diverting pulleys, the traction sheave and the hoisting ropes in other ways than in the roping arrangements described in the examples. It is also obvious to the skilled person that, in the elevator of the invention, the elevator may also be provided with a counterweight, in which elevator the counterweight has e.g. a weight advantageously below that of the car and is suspended with a separate roping, the elevator car being suspended partly by means of the hoisting ropes and partly by means of the counterweight and its roping.

Due to the bearing resistance of the rope pulleys used as diverting pulleys and to the friction between the ropes and the rope sheaves and possible losses occurring in the compensating system, the ratio between the rope tensions may deviate somewhat from the nominal ratio of the compensating system. Even a deviation of 5% will not involve any significant disadvantage because in any case the elevator must have a certain inbuilt robustness.

The invention claimed is:

1. A traction sheave elevator without counterweight, comprising:

an elevator car suspended by a hoisting rope;

a traction sheave operatively connected to the elevator car by the hoistingrope; and a brake structure configured to engage with the traction sheave in a braking operation in an upward motion and a downward motion of the elevator car;

wherein the brake structure includes:

a first brake element; and a second brake element;

wherein the first brake element includes:

a surface engageable with the traction sheave;

a first contact surface; and a first sliding surface;

wherein the second brake element includes:

a second contact surface opposite to the first contact surface; and a second sliding surface opposite to the first sliding surface;

wherein, during a braking operation, when the elevator car moves with the upward motion, the first sliding surface slides along the second sliding surface relative to the second brake element and a distance between the first and second contact surfaces increases, so as to provide a braking force that is less than a full braking force, and wherein, during a braking operation, when the elevator car moves with the downward motion, the second contact surface contacts the first contact surface in order to prevent the first sliding surface from sliding along the second sliding surface relative to the second brake element, so as to provide the full braking force.

2. The elevator of claim 1, wherein the elevator has a rope portion of the hoisting rope going upwards from the elevator car and a rope portion of the hoisting rope going downwards from the elevator car, wherein the rope portion going upwards from the elevator car is under a first rope tension, and wherein the rope portion going downwards from the elevator car is under a second rope tension.

3. The elevator of claim 1, further comprising:

a compensating system;

wherein a first end of the hoisting rope connects to a fixed point of the compensating system through a movable pulley, and wherein a second end of the hoisting rope connects to an axle of the movable pulley.

4. The elevator of claim 1, further comprising:

a control arrangement configured to delay the braking operation when the elevator car moves with the upward motion in an emergency stop situation.

5. The elevator of claim 1, further comprising:

a reserve power source.

6. The elevator of claim 1, further comprising:

a bearing between the first sliding surface and the second sliding surface.

7. The elevator of claim 1, wherein the second brake element further includes:

a protrusion at one side of the second brake element;

wherein the second contact surface is a surface of the protrusion.

8. The elevator of claim 1, wherein the brake structure further includes:

an elastic member attached to the first brake element to engage the brake structure to the traction sheave, and a winding attached to the first brake element to interact with the elastic member.

9. The elevator of claim 3, wherein the second end of the hoisting rope connects to the axle of the movable pulley through a fixed pulley.

10. The elevator of claim 4, wherein the delay is constant.

11. The elevator of claim 4, wherein the delay is dependent on a speed of the elevator car.

12. The elevator of claim 4, wherein the delay is dependent on an acceleration of the elevator car.

13. The elevator of claim 4, wherein the delay is dependent on a mass of the elevator car.

14. A method of braking a traction sheave elevator without counterweight, comprising:

engage a traction sheave with a brake structure during upward motion and downward motion of an elevator car of the elevator;

engaging a first brake element and a second brake element of the brake structure to a locked position during a braking of the traction sheave when the elevator car moves with the downward motion; and displacing the first brake element relative to the second brake element to lighten a braking force on the traction sheave when the elevator car moves with the upward motion;

wherein, when the elevator car moves with the upward motion, a first sliding surface of the first brake element slides along a second sliding surface of the second brake element and a distance between the first and second contact surfaces increases so as to lighten the braking force on the traction sheave, and wherein, when the elevator car moves with the downward motion, a second contact surface of the second brake element contacts a first contact surface of the first brake element in order to prevent the first sliding surface from sliding along the second sliding surface relative to the second brake element so as to provide a full braking force on the traction sheave.

15. The method of claim 14, further comprising:

using an elastic member to engage the first brake element to the second brake element.

16. The method of claim 14, further comprising:

controlling the braking force using an elastic member and a winding.

17. The method of claim 14, further comprising:

compensating for a hoisting rope elongation by a motion of a diverting pulley.

18. A traction sheave elevator without counterweight, comprising:

an elevator car suspended by a hoisting rope;

a traction sheave operatively connected to the elevator car by the hoisting rope;

a brake structure configured to engage with the traction sheave in a braking operation in an upward motion and a downward motion of the elevator car; and a compensating system;

wherein the brake structure includes:

a first brake element; and a second brake element;

wherein the first brake element includes:

a surface engageable with the traction sheave;

a first contact surface; and a first sliding surface;

wherein the second brake element includes:

a second contact surface opposite to the first contact surface; and a second sliding surface opposite to the first sliding surface;

wherein, during a braking operation, when the elevator car moves with the upward motion, the first sliding surface slides along the second sliding surface relative to the second brake element and a distance between the first and second contact surfaces increases, wherein, during a braking operation, when the elevator car moves with the downward motion, the second contact surface contacts the first contact surface in order to stop a sliding motion of the first brake element, wherein a first end of the hoisting rope connects to a fixed point of the compensating system through a movable pulley, and wherein a second end of the hoisting rope connects to an axle of the movable pulley.

19. The elevator of claim 18, wherein the elevator has a rope portion of the hoisting rope going upwards from the elevator car and a rope portion of the hoisting rope going downwards from the elevator car, wherein the rope portion going upwards from the elevator car is under a first rope tension, and wherein the rope portion going downwards from the elevator car is under a second rope tension.

20. The elevator of claim 18, wherein the second end of the hoisting rope connects to the axle of the movable pulley through a fixed pulley.

* * * * *